United States Patent [19]

Koslowski et al.

[11] Patent Number: 4,971,627

[45] Date of Patent: Nov. 20, 1990

[54] METHOD FOR PRODUCING AND USING A CEMENT-TYPE BINDING MATERIAL

[75] Inventors: Thomas Koslowski; Udo Ludwig; Alexander Froehlich, all of Aachen, Fed. Rep. of Germany

[73] Assignee: Kalkwerke Rheine GmbH, Bochum, Fed. Rep. of Germany

[21] Appl. No.: 371,423

[22] Filed: Jun. 26, 1989

[30] Foreign Application Priority Data

Jun. 27, 1988 [DE] Fed. Rep. of Germany ....... 3821657

[51] Int. Cl.$^5$ .............................................. C04B 11/30
[52] U.S. Cl. ............................... 106/752; 106/DIG. 1; 106/751; 106/757
[58] Field of Search .................. 106/103, 109, DIG. 1; 423/242 A, 242 R, 244 A, 244 R

[56] References Cited

U.S. PATENT DOCUMENTS

| | | | |
|---|---|---|---|
| 4,108,677 | 8/1978 | Valiga | 106/109 |
| 4,256,504 | 3/1981 | Dunstan, Jr. | 106/109 |
| 4,470,850 | 9/1984 | Bloss | 106/103 |
| 4,495,162 | 1/1985 | Jons et al. | |
| 4,507,154 | 3/1985 | Burge et al. | 106/315 |

FOREIGN PATENT DOCUMENTS 3037056  4/1982  Fed. Rep. of Germany .

OTHER PUBLICATIONS

Concrete Admixtures Handbook, Ed.-V.S. Ramachandran, 1984, Noyes Publications, pp. 116-125.
Article Published in "Zement-Kalk-Gips", No. 1/1986, vol. 39, pp. 33-35, entitled: "The Suitability of Anhydrite from Flue Gas Sulphur Dioxide as a Sulphate Admixture", by H. Mosch.

Primary Examiner—William R. Dixon, Jr.
Assistant Examiner—Chris Gallo
Attorney, Agent, or Firm—W. G. Fasse; D. H. Kane, Jr.

[57] ABSTRACT

A cement-type binding material suitable as a building material for use in the manner of a Portland cement including for underground work, or as a curing accelerating additive in mortar cement or masonry cement or in concrete or as a basic material for producing building components, is produced by mixing flue dust or flue ash with a product obtained by desulfurizing flue gases. The quantity of flue dust or ash is so measured than any free lime and lime being freed during an oxidizing and calcining treatment is completely bound to aluminates and silicates capable of reacting with water. The so produced intermediate multi-phase product is milled to a certain fineness and mixed with slag sand also milled to a certain fineness. The so obtained product is suitable for use in all instances where gypsum could not be used heretofore or could be used only under expensive protective measures.

16 Claims, 1 Drawing Sheet

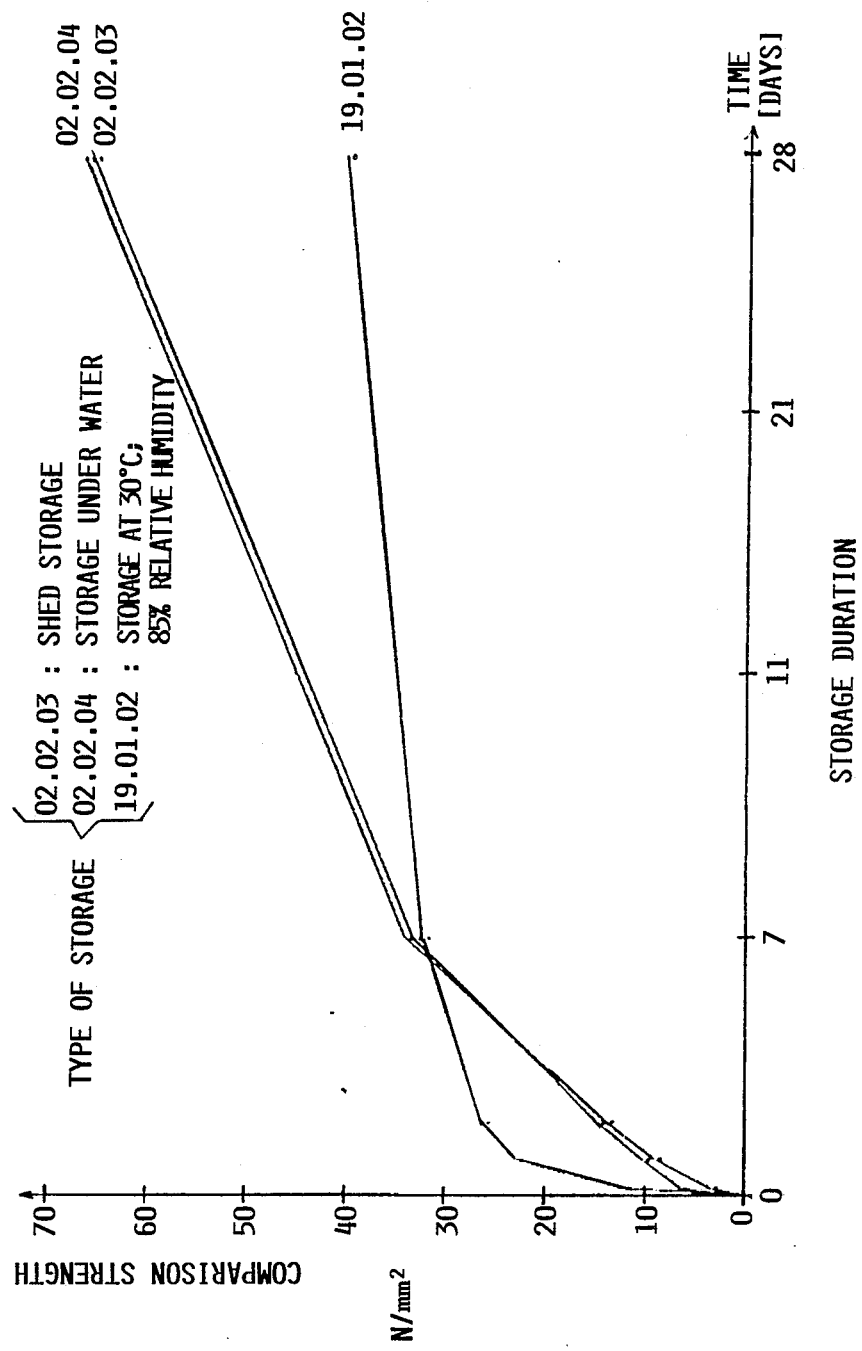

METHOD FOR PRODUCING AND USING A CEMENT-TYPE BINDING MATERIAL

FIELD OF THE INVENTION

The invention relates to a method for producing a cement-type binding material of a gypsum or Portland cement-type. The invention also discloses how to use such a binding material for construction purposes.

BACKGROUND INFORMATION

The desulfurization of flue gas results in a product containing calcium sulfite and/or calcium sulfate and calcium hydroxide or calcium carbonate. It is known to subject such a desulfurization product to an oxidation and calcining treatment.

Where the desulfurization product is the result of desulfurizing the flue gases resulting from the operation of hard coal fired power plants after the spray drying-absorption process (SDA-process), the product has substantially the following composition:

calcium sulfite 0.5-hydrate: $CaSO_3 * 0.5\ H_2O$
calcium sulfate 0.5-hydrate: $CaSO_4 * 0.5\ H_2O$
calcium hydroxide: $Ca(OH)_2$
calcium carbonate: $CaCO_3$, and
traces of hard coal flue ash.

The safe storage of such a desulfurization product causes substantial difficulties because one must take into account that the product contains not only soluble sulfates, but also sulfitic components which tend to withdraw oxygen from the ground water.

German Patent Publication (DE-PS) No. 3,037,056 (Bloss) discloses the treatment of a product that is obtained by a wet flue gas desulfurization. Such a product contains calcium sulfite 0.5-hydrate and calcium sulfite di-hydrate. The known treatment results in a product that can be used as a cement, whereby an environmentally detrimental storage becomes unnecessary. The preparation of the flue gases resulting from the combustion of fossil fuels involves a treatment in a washer containing a calcium suspension, whereby, among other components a calcium sulfite 0.5-hydrate is produced. Air is added in order to convert the calcium sulfite 0.5-hydrate partially into a calcium sulfate dihydrate containing suspension which is withdrawn from a water circulating circuit and supplied to a concentrator where it is substantially dewatered. The resulting solid still containing a limited amount of remainder moisture is removed while the liquid is preferably returned to the washer.

An article published in "Zement-Kalk-Gips", (Cement-Lime-Gypsum), No. 1/1986, Volume 39, pages 33 to 35 discloses another method for treating a half-dried product resulting from a flue gas desulfurization. The treatment involves an oxidation resulting in a product suitable for building purposes. The product is in the form of an anhydrite ($CaSO_4$). The known method converts a sulfite containing product by oxidation into a technically usable calcium sulfate which is suitable for use as a sulfate supplier in Portland cement or in blast furnace cement.

It is also known in the plastering art to use binding agents, the strength of which is based on the following reaction:

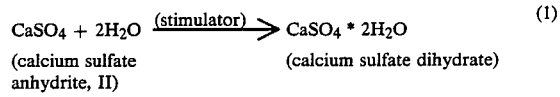

(calcium sulfate anhydrite, II) (calcium sulfate dihydrate)

The above mentioned binding agents are distinguished by the fact that in the form of pastes, mortars, or concretes, they lead quickly to a high strength. For example, the above mentioned reaction is employed in the so-called self-leveling flooring plaster based on synthetic calcium sulfate anhydrite ($CaSO_4$) or based on natural calcium sulfate anhydrite used in connection with underground construction materials, for example in mines or below grade level.

The strength providing phase of the gypsum based product is always the calcium sulfate dihydrate ($CaSO_4 \times 2H_2O$) regardless whether the starting material employs calcium sulfate anhydrite (II) ($CaSO_4$) or calcium sulfate 0.5 hydrate ($CaSO_4 * 0.5\ H_2O$). Calcium sulfate dihydrate (gypsum) has a solubility in water of 1.81 g/l at 3° C. or 2.04 g/l at 50° C. As a result, conventional gypsum based building materials have an increased water sensitivity or moisture sensitivity which limits the use of such products in many applications.

Another disadvantage of the above prior art methods is seen in that the products are dependent in their material strength on the reaction (1) set forth above. As a result, the material strength of these products are subject to narrow limits as far as temperature is concerned, for example, when these products are used as construction materials below ground level or in mines. The temperature limitation applies particularly for the stimulation system of reaction (1) the effectiveness of which diminishes strongly above 35° C.

OBJECTS OF THE INVENTION

In view of the foregoing it is the aim of the invention to achieve the following objects singly or in combination:

to provide a method for producing a binding agent or a binder mixture which uses as a starting material the products of the desulfurization and other by-products of the flue gases, whereby the binding agent avoids the above described drawbacks or disadvantages;

to provide a product that not only functions as a binding agent, but simultaneously greatly simplifies or even avoids the environmental problems resulting from the desulfurization of flue gases;

to provide a binding material for construction purposes that can be used instead of conventional gypsum based products without requiring any expensive protection measures or needs only protection measures at greatly reduced costs;

to provide a binding material the strength reaction of which is not limited to temperatures below 35° C.;

to provide a binding material in which the strength reaction is even accelerated at higher temperatures; and to provide a binding agent that has a smaller ability to go into solution in water than that of gypsum.

SUMMARY OF THE INVENTION

According to the invention the desulfurized flue gas product is mixed with such a quantity of flue ash that during the subsequent oxidizing and calcining step any free lime and any lime becoming free is completely bound by aluminates and silicates capable of reacting with water. The oxidizing and calcining results in an intermediate multi-phase product having the following composition in parts by weight of the intermediate product Cs=5 to 60, $C_{12}A_7$=2 to 35, $C_3A_3Cs$=1 to 20, and $\beta$-$C_2S$=3 to 50, wherein C=lime (CaO), s=sulfur trioxide ($SO_3$), A=aluminum oxide (alumina $Al_2O_3$), s=silicon dioxide (silica $SiO_2$). The intermediate product is milled to a milling fineness so that 1 gram of grains has a specific surface area within the range of 3,000 to 10,000 cm$^2$/g according to Blaine. The milled product is mixed with slag sand in a ratio of 100 parts by weight of milled product to 10 to 50 parts by weight of slag sand which was also milled to have a specific surface area within the range of 2,500 to 5,000 cm$^2$/g according to Blaine.

Thus, according to the invention the desulfurization product produced from flue gases and containing calcium hydroxide or calcium carbonate are mixed with flue dust or flue ash of normal composition in such a way that during the following oxidizing and calcining operation in a temperature range of 700° C. to 900° C. the content of free lime (Ca(OH)$_2$, CaO) is completely bound by aluminates and silicates capable of reacting with water. As a result of this binding during the oxidation and calcining oxidation, calcium sulfate anhydrite (II), reactive calcium aluminates in the form of $C_{12}A_7$, $C_3A_3Cs$ as well as reactive calcium silicates in the form of $\beta$-$C_2S$ are formed. Therefore, when pastes, mortars, and concretes are formed of the resulting material, the strength forming reaction does not take place in accordance with the reaction (1) set forth above and calcium sulfate dihydrate (CaSO$_4$*2H$_2$O) is not formed. Rather, the reaction products are formed substantially in accordance with the following reaction equations:

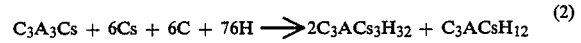 (2)

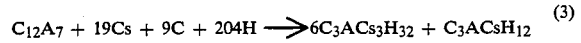 (3)

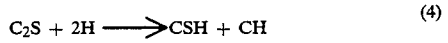 (4)

Experimental tests have shown the foregoing reactions are not limited to a temperature range below 35° C. Rather, higher temperatures substantially accelerate above reactions. Additionally, the reaction products are characterized by a substantially smaller solubility in water. As a result, a considerably improved stability against water or moisture is obtained as compared to conventional products, wherein the binding agent is gypsum.

By using flue ash or flue dust that is rich in silicic acid components, it is possible to increase the proportion of silicates capable of reacting with water. Similarly, by using flue ashes or flue dust rich in $Al_2O_3$ it is possible to increase the proportion of aluminates capable of reacting with water. Thus, according to the invention different types of flue ash or flue dust can be mixed in the desired ratios for the present purposes.

BRIEF DESCRIPTION OF THE DRAWING

The single FIGURE shows the compression strength of the present binding material as a function of storage time and with different types of storage as parameters.

DETAILED DESCRIPTION OF PREFERRED EXAMPLE EMBODIMENTS AND OF THE BEST MODE OF THE INVENTION

It is to be understood that according to the invention the term "calcium sulfate" is intended to encompass all phases of the system CaSO$_4$-H$_2$O. Similarly, the term "calcium sulfite" is intended to encompass all phases of the system CaSO$_3$-H$_2$O.

The oxidizing and calcining is performed at temperatures within the range of 700° C., especially 750° C. to 900° C. and most preferably at temperatures within the range of 800° C. to 850° C. The oxidizing and calcining is performed as long as is necessary to form the above described phases capable of reacting with water, for example, the oxidizing and calcining will continue until calcium sulfite - 0.5-hydrate (CaSO$_3$*0.5H$_2$O) is no longer present in the product.

Conventional equipment is suitable for performing the oxidizing and calcining operation, for example, rotary kilns, flow calcinators, fluidized bed calcinators, and similar equipment may be used.

The intermediate multi-phase product resulting from the oxidizing and calcining of a desulfurization product comprises the following compounds capable of reacting and in the following proportion:

Cs=5 to 60, preferably 20 to 35, parts by weight,
$C_{12}A_7$=2 to 35, preferably 5 to 20, parts by weight,
$C_3A_3C,s$=1 to 20, preferably 5 to 10, parts by weight,
$C_2S$=3 to 50, preferably 5 to 25, parts by weight.

whereby C, s, A, and S have the above stated connotations as lime, sulfur trioxide, alumina, and silica, respectively.

The intermediate multi-phase product is milled to the above mentioned milling fineness within the range of 3,000 to 10,000 cm$^2$/g according to Blaine, preferably with a fineness within the range of 6,000 to 7,000 cm$^2$/g according to Blaine. The so milled product is then mixed with also milled slag sand having the following composition:

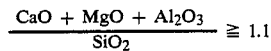

Although a ratio of 1.1 in the just stated composition is acceptable, a ratio of larger than 1.6 or even larger than 1.8 is preferable. The upper limit should be 2.5 The slag sand is milled to a fineness within the above stated range of 2,500 to 5,000 cm$^2$/g according to Blaine, preferably 3,000 to 4,500 cm$^2$/g and most preferable 3,500 to 4,000 cm$^2$/g according to Blaine. The proportion of milled slag sand to the intermediate product is 10 to 50 parts by weight, preferably 15 to 20 parts by weight of slag sand to 100 parts of oxidized and calcined intermediate multi-phase product.

It is possible to admix to the present cement-type binding material an accelerator for reducing the curing time. Such accelerator may be in the form of iron sulfate, either containing water or free of water and in a proportion within the range of 2 to 5, preferably 2 to 3 parts by weight for each 100 parts of the intermediate oxidized and calcined product.

It is further possible to retard the curing, thereby prolonging the curing time by the admixture of an acyclic carbonic acid such as citric acid, tartaric acid, malic acid, and similar acids or the salts of these acids taken either alone or as a combination of these salts and/or acids. Advantageous proportions of the curing retardants are within the range of 0.05 to 0.2 parts by weight for 100 parts of the oxidized and the calcined product.

It is also within the scope of the invention to add flux agents, for example, in the form of condensed melamine resin products, naphtalinesulfonates, and similar materials. Thickening agents may also be added, for example, in the form of methylcellulose materials. Further, bonding or adhesion improving agents may also be added. Depending on the type of use intended, the cement-type binding material according to the invention may be used by itself or with the above mentioned additives to make pastes, mortars, or concretes.

EXAMPLE EMBODIMENT

An intermediate multi-phase product is obtained by first mixing 65 parts by weight of a sulfitic desulfuration product with 35 parts by weight of hard coal flue dust or ash. The mixture is calcined and oxidized at a temperature of 800° C., whereupon it is milled to obtain a milling fineness of 7,500 cm$^2$/g according to Blaine. 33.20 parts by weight of this intermediate product are formed into a dry mortar by mixing with the following additives:

| | |
|---|---|
| milled slag sand | 6.0 parts by weight, |
| iron sulfate | 0.8 parts by weight, |
| crashed lime sand | 60.0 parts by weight, and |
| citric acid monohydrate | 0.03 parts by weight. |

The crashed lime sand has a grain size in the range of 0 to 4 mm. The so produced dry mortar is mixed with water in the ratio of water to dry material=0.17. The resulting wet or fresh mortar is easily workable and has a spreading measure (AB) of 18 cm. The solidification or curing begins after about 30 minutes.

Analysis of the reaction products of the binding material have been found as follows:

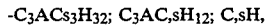
-$C_3ACs_3H_{32}$; $C_3AC_sH_{12}$; $C_sH$, whereby the letter A, C, and s have the above mentioned connotations, while H stands for water ($H_2O$).

Referring to the single figure, it will be noted that the duration of the storage and the type of the storage influence the compression strength of the material. The compression strength $\beta D$ (N/mm$^2$) is shown on the ordinate and the duration of the storage is shown in days on the abscissa. Shed storage and storage under water results in approximately the same compression strength after 28 days. Storage in a controlled climate of 30° C. at 85% relative humidity resulted in a reduced compression strength. During shed storage the temperature was about 18° C. and the relative humidity was about 50%.

Although the invention has been described with reference to specific example embodiments, it will be appreciated that it is intended to cover all modifications and equivalents within the scope of the appended claims.

What we claim is:

1. A method for producing a cement material in the form of a multi-phase mixture including calcium sulfate and $\beta$-$C_2S$, comprising the following steps:
   (a) desulfurizing flue gases to provide a desulfurized starting product containing calcium in a form selected from the group consisting of calcium sulfite, calcium sulfate, calcium hydroxide, and calcium carbonate,
   (b) mixing flue ash or flue dust with said desulfurized starting product to form a mixture in which said flue dust is present in such proportion that any free lime present and lime produced by a subsequent oxidizing and calcining step is completely bound by aluminates and silicates capable of reacting with water,
   (c) oxidizing and calcining said mixture at a temperature within the range of 700° C. to 950° C. to provide an intermediate multi-phase product in which the following components are present in parts by weight of the total intermediate product:
   $Cs$=5 to 60, $C_{12}A_7$=2 to 35, $C_3A_3Cs$=1 to 20, and $\beta$-$C_2S$=3 to 50,
   wherein C=CaO; s=SO$_3$; A=Al$_2$O$_3$; and S=SiO$_2$,
   (d) milling said intermediate multi-phase product such that a grain fineness according to Blaine is within the range of 3,000 to 10,000 cm$^2$/g,
   (e) milling slag to form slag sand having a grain finess according to Blaine within the range of 2,500 to 5,000 cm$^2$/g, and
   (f) combining by mixing 100 parts by weight of said intermediate multi-phase product with 10 to 50 parts by weight of said slag sand to form said cement material as a mixture capable of the following strength forming reactions

$C_3A_3Cs + 6Cs + 6C + 76 H \longrightarrow 2C_3ACs_3H_{32} + C_3ACsH_{12}$

$C_{12}A_7 + 19Cs + 9C + 204H \longrightarrow 6C_3ACs_3H_{32} + C_3ACsH_{12}$

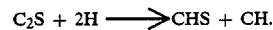
$C_2S + 2H \longrightarrow CHS + CH.$

2. The method of claim 1, further comprising:
   (a) adjusting in said intermediate multi-phase product, in parts by weight, within the following ranges: said $Cs$=20 to 35, said $C_{12}A_7$=5 to 20, said $C_3A_3Cs$=5 to 10, and said $\beta$-$C_2S$=5 to 25,
   (b) milling said intermediate multi-phase product to a grain fineness according to Blaine within the range of 6,000 to 7,000 cm$^2$/g,
   (c) milling said slag to provide slag sand with a grain fineness according to Blaine within the range of 3,000 to 4,500 cm$^2$/g, and
   (d) combining by mixing 100 parts by weight of said intermediate multi-phase product with 15 to 20 parts by weight of said slag sand to provide said cement material.

3. The method of claim 2, wherein said adjusting step of said components of said intermediate multi-phase product with regard to a proportion of silicates (S) and aluminates (A) capable of reacting with water is controlled (influenced) by a respective selection of said flue ash or flue dust.

4. The method of claim 1, wherein said oxidizing and calcining step is performed within a temperature range of 750° C. to 900° C.

5. The method of claim 1, wherein said milling step on said slag is performed to provide slag sand with a grain fineness within the range of 3,500 to 4,000 cm$^2$/g according to Blaine.

6. The method of claim 1, wherein said slag sand is selected to have a ratio of CaO+MgO+Al$_2$O$_3$ to SiO$_2$ within the range of 1.1 to 1.8.

7. The method of claim 1, further comprising adding a quantity of a reaction accelerator to said cement material, said reaction accelerator quantity being within the range of 1 to 5 parts by weight, for 100 parts by weight of said intermediate multi-phase product.

8. The method of claim 7, wherein said reaction accelerator is iron sulfate containing water.

9. The method of claim 7, wherein said reaction accelerator is iron sulfate free of water.

10. The method of claim 1, further comprising adding a quantity of a reaction retardant to said cement-type binding material, said reaction retardant quantity being within the range of 0.05 to 0.20 parts by weight for 100 parts by weight of said intermediate multi-phase product.

11. The method of claim 10, wherein said reaction retardant is an acyclic carboxylic acid.

12. The method of claim 10, wherein said reaction retardant is a soluble salt of an acyclic acid.

13. The method of claim 10, wherein said reaction retardant is citric acid monohydrate.

14. The method of claim 1, further comprising mixing said cement material with other structural materials selected from the group consisting of sand and gravel.

15. The method of claim 1, wherein said slag sand is selected to have a ratio of $CaO + MgO + Al_2O_3$ to $SiO_2$ within the range of 1.1 to 2.5.

16. The method of claim 1, wherein said oxidizing and calcining step is performed within a temperature range of 800° C. to 850° C.

* * * * *